(12) United States Patent
Akimoto

(10) Patent No.: US 8,380,376 B2
(45) Date of Patent: Feb. 19, 2013

(54) POWER OUTPUT APPARATUS, HYBRID VEHICLE PROVIDED WITH POWER OUTPUT APPARATUS, AND CONTROL METHOD OF POWER OUTPUT APPARATUS

(75) Inventor: Hikokazu Akimoto, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 296 days.

(21) Appl. No.: 12/719,328

(22) Filed: Mar. 8, 2010

(65) Prior Publication Data

US 2010/0256849 A1 Oct. 7, 2010

(30) Foreign Application Priority Data

Apr. 2, 2009 (JP) ................. 2009-090331

(51) Int. Cl.
| | |
|---|---|
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |
| B60T 7/12 | (2006.01) |
| G06F 19/00 | (2006.01) |
| G06G 7/70 | (2006.01) |

(52) U.S. Cl. ........... 701/22; 701/101; 701/103; 701/110
(58) Field of Classification Search .................... 701/22, 701/101, 103, 110
See application file for complete search history.

(56) References Cited

U.S. PATENT DOCUMENTS

| | | | | |
|---|---|---|---|---|
| 6,843,337 B2 * | 1/2005 | Matsubara et al. | ........ | 180/65.26 |
| 6,965,824 B2 * | 11/2005 | Ichimoto et al. | ............... | 701/113 |
| 7,055,312 B2 * | 6/2006 | Osawa et al. | ................... | 60/285 |
| 7,062,916 B2 * | 6/2006 | Kamijo et al. | ................... | 60/706 |
| 7,291,093 B2 * | 11/2007 | Yamamoto et al. | ........... | 477/110 |
| 7,444,220 B2 * | 10/2008 | Yamazaki | ........................ | 701/51 |
| 7,587,269 B2 | 9/2009 | Kamichi et al. | | |
| 7,587,629 B2 * | 9/2009 | Okamoto et al. | ............. | 714/6.32 |
| 7,640,744 B2 * | 1/2010 | Rollinger et al. | ............. | 60/605.1 |
| 7,721,833 B2 * | 5/2010 | Kikuchi | ..................... | 180/65.28 |
| 8,032,289 B2 * | 10/2011 | Ando | ............................ | 701/103 |
| 2001/0039230 A1 * | 11/2001 | Severinsky et al. | ............... | 477/3 |

FOREIGN PATENT DOCUMENTS

| | | |
|---|---|---|
| JP | 11164403 A | 6/1999 |
| JP | 2006020457 A | 1/2006 |
| JP | 2007084034 A | 4/2007 |
| JP | 2007216795 A | 8/2007 |
| JP | 2008195143 A | 8/2008 |

* cited by examiner

*Primary Examiner* — Asfand Sheikh
(74) *Attorney, Agent, or Firm* — Gifford, Krass, Sprinkle, Anderson & Citkowski, P.C.

(57) ABSTRACT

An apparatus includes an engine; an exhaust gas control apparatus; a first and second electric motors; a power distributing portion that is connected to an engine shaft, a rotating shaft of the first electric motor, and a drive shaft that inputs/outputs power to/from the second electric motor; a power storage device that supplies/receives electric power to/from the two motors; a setting portion that sets a required torque of the drive shaft; and a control portion that, when there is a demand to decelerate the drive shaft while a fuel-supply to the engine is being prohibited, controls the engine and the two motors such that torque based on the required torque is output to the drive shaft and an engine speed is decreased to a self-sustaining speed with the fuel-supply and an adjustment that increases the intake air amount of the engine as the temperature of the power storage device increases.

9 Claims, 8 Drawing Sheets

POWER OUTPUT APPARATUS, HYBRID VEHICLE PROVIDED WITH POWER OUTPUT APPARATUS, AND CONTROL METHOD OF POWER OUTPUT APPARATUS

INCORPORATION BY REFERENCE

The disclosure of Japanese Patent Application No. 2009-090331 filed on Apr. 2, 2009 including the specification, drawings and abstract is incorporated herein by reference in its entirety.

BACKGROUND OF THE INVENTION

1. Field of the Invention

The invention relates to a power output apparatus, a hybrid vehicle provided with that power output apparatus, and a control method of a power output apparatus.

2. Description of the Related Art

Japanese Patent Application Publication No. 2004-340102 (JP-A-2004-340102), for example, describes a power output apparatus that includes an internal combustion engine, a planetary gear set that has a planetary carrier connected to a crankshaft of the internal combustion engine, a first electric motor that generates electric power and is connected to a sun gear of the planetary gear set, a second electric motor that outputs power to a ring gear shaft that serves as a drive shaft and is connected to the ring gear of the planetary gear set, and a battery that supplies and receives power to and from the first electric motor and the second electric motor. With this power output apparatus, a supply of fuel to the internal combustion engine is prohibited from being stopped (i.e., a fuel cut is prohibited) to suppress degradation of a catalyst that purifies the exhaust gas of the internal combustion engine when the temperature of the catalyst is equal to or above a set temperature. If there is a demand to decelerate the drive shaft while a fuel cut is being prohibited, the internal combustion engine is controlled so that the output torque becomes a value of 0, and the rotation speed (also simply referred to as "speed" in this specification) of the internal combustion engine is maintained at the value at that time by the first electric motor, while the second electric motor is controlled to output regenerative braking force. Also, Japanese Patent Application Publication No. 2007-084034 (JP-A-2007-084034), for example, describes this type of power output apparatus. When the brake pedal is depressed while a catalyst degradation suppression flag is set to a value of 1 such that a request is being made to suppress catalyst degradation, the described power output apparatus first controls a motor (i.e., the first electric motor) to decrease the speed of the internal combustion engine to a predetermined target speed (such as 800 to 1000 rpm) while the internal combustion engine continues to fire, and then the internal combustion engine is operated on its own.

Like the technology described in JP-A-2004-340102, having the first electric motor maintain or increase the speed of the internal combustion engine when there is a demand to decelerate the drive shaft while a fuel cut is being prohibited in order to suppress catalyst degradation enables braking force from the so-called engine brake to be output to the drive shaft. It is also possible to inhibit the battery from being overcharged by the electric power regenerated by the second electric motor because the first electric motor consumes electric power. However, if the speed of the internal combustion engine is maintained even though there is a demand for deceleration, it may feel odd to an occupant of the vehicle provided with the power output apparatus. Therefore, if there is a demand to decelerate the drive shaft while a fuel cut is being prohibited to suppress catalyst degradation, the first electric motor is preferably controlled to reduce the speed of the internal combustion engine, like the technology described in JP-A-2007-084034. However, when decreasing the speed of the internal combustion engine, the first electric motor functions as a generator and generates electric power. Therefore, when the amount of electric power that is allowed to be charged to the battery is being limited due to the state of the battery, it becomes necessary to prohibit the speed of the internal combustion engine from being reduced using the first electric motor in order to suppress battery degradation due to overcharging. And if the speed of the internal combustion engine is no longer able to be reduced using the first electric motor in this way, the speed of the internal combustion engine will not quickly decrease even though there is a demand for deceleration, which may feel odd to the occupant of the vehicle provided with the power output apparatus.

SUMMARY OF THE INVENTION

Therefore, the power output apparatus, the hybrid vehicle provided with that power output apparatus, and the control method of the power output apparatus of the invention quickly reduce the speed of an internal combustion engine when there is a demand to decelerate a drive shaft while a supply of fuel to the internal combustion engine is prohibited from being stopped in order to suppress catalyst degradation.

A first aspect of the invention relates to a power output apparatus that outputs power to a drive shaft. This power output apparatus includes an internal combustion engine; an exhaust gas control apparatus that includes a catalyst for purifying exhaust gas discharged from the internal combustion engine; a first electric motor that inputs and outputs power; a power distributing portion that is connected to three shafts, including an engine shaft of the internal combustion engine, a rotating shaft of the first electric motor, and the drive shaft, and inputs and outputs power that is based on power input and output from and to two of these three shafts, to and from the remaining shaft; a second electric motor that inputs and outputs power from and to the drive shaft; a power storage device that supplies and receives electric power to and from the first electric motor and the second electric motor; a required torque setting portion that sets a required torque that is required at the drive shaft; and a control portion that, when there is a demand to decelerate the drive shaft while a supply of fuel to the internal combustion engine is being prohibited to suppress degradation of the catalyst, controls the internal combustion engine, the first electric motor, and the second electric motor such that torque based on the set required torque is output to the drive shaft and the rotation speed of the internal combustion engine is decreased to a preset self-sustaining rotation speed with the supply of fuel and an intake air adjustment that increases the intake air amount of the internal combustion engine as the temperature of the power storage device increases.

With the power output apparatus according to this first example embodiment, when there is a demand to decelerate the drive shaft while a supply of fuel to the internal combustion engine is being prohibited to suppress degradation of the catalyst, the internal combustion engine, the first electric motor, and the second electric motor are controlled such that torque based on the set required torque is output to the drive shaft and the rotation speed of the internal combustion engine is decreased to a preset self-sustaining rotation speed with the supply of fuel and an intake air adjustment that increases the intake air amount of the internal combustion engine as the temperature of the power storage device increases. By executing the intake air adjustment that increases the intake air amount of the internal combustion engine as the temperature of the power storage device increases when there is a demand to decelerate the drive shaft while a supply of fuel to the internal combustion engine is being prohibited to suppress degradation of the catalyst in this way, even if the rotation speed of the internal combustion engine stops being decreased by the first electric motor taking into account the fact that the temperature of the power storage device is relatively high such that the power that is allowed to be charged is limited, it is still possible to promote a decrease in the rotation speed of the internal combustion engine by increasing the friction by adjusting the intake air amount. Therefore, with the power output apparatus according to this aspect, the rotation speed of the internal combustion engine can be quickly decreased regardless of the state of the power storage device, when there is a demand to decelerate the drive shaft while a supply of fuel to the internal combustion engine is being prohibited to suppress degradation of the catalyst.

A second aspect of the invention relates to a hybrid vehicle that includes the power output apparatus according to the first aspect described above, and a driving wheel that is connected to the drive shaft. With the hybrid vehicle according to this second aspect, the rotation speed of the internal combustion engine can be quickly decreased regardless of the state of the power storage device, when there is a demand to decelerate the drive shaft while a supply of fuel to the internal combustion engine is being prohibited to suppress degradation of the catalyst.

A third aspect of the invention relates to a control method of a power output apparatus provided with an internal combustion engine, an exhaust gas control apparatus that includes a catalyst for purifying exhaust gas discharged from the internal combustion engine, a first electric motor that inputs and outputs power, a power distributing portion that is connected to three shafts, including an engine shaft of the internal combustion engine, a rotating shaft of the first electric motor, and the drive shaft, and inputs and outputs power that is based on power input and output from and to two of these three shafts, from and to the remaining shaft, a second electric motor that inputs and outputs power from and to the drive shaft, and a power storage device that supplies and receives electric power to and from the first electric motor and the second electric motor. This control method includes controlling, when there is a demand to decelerate the drive shaft while a supply of fuel to the internal combustion engine is being prohibited to suppress degradation of the catalyst, the internal combustion engine, the first electric motor, and the second electric motor such that torque based on a required torque that is required at the drive shaft is output to the drive shaft and the rotation speed of the internal combustion engine is decreased to a preset self-sustaining rotation speed with the supply of fuel and an intake air adjustment that increases the intake air amount of the internal combustion engine as the temperature of the power storage device increases.

According to the control method of a power output apparatus according to this third aspect, the rotation speed of the internal combustion engine can be quickly decreased regardless of the state of the power storage device, when there is a demand to decelerate the drive shaft while a supply of fuel to the internal combustion engine is being prohibited to suppress degradation of the catalyst.

BRIEF DESCRIPTION OF THE DRAWINGS

The foregoing and/or further objects, features and advantages of the invention will become more apparent from the following description of example embodiments with reference to the accompanying drawings, in which like numerals are used to represent like elements and wherein.

DETAILED DESCRIPTION OF EMBODIMENTS

Figure 1:
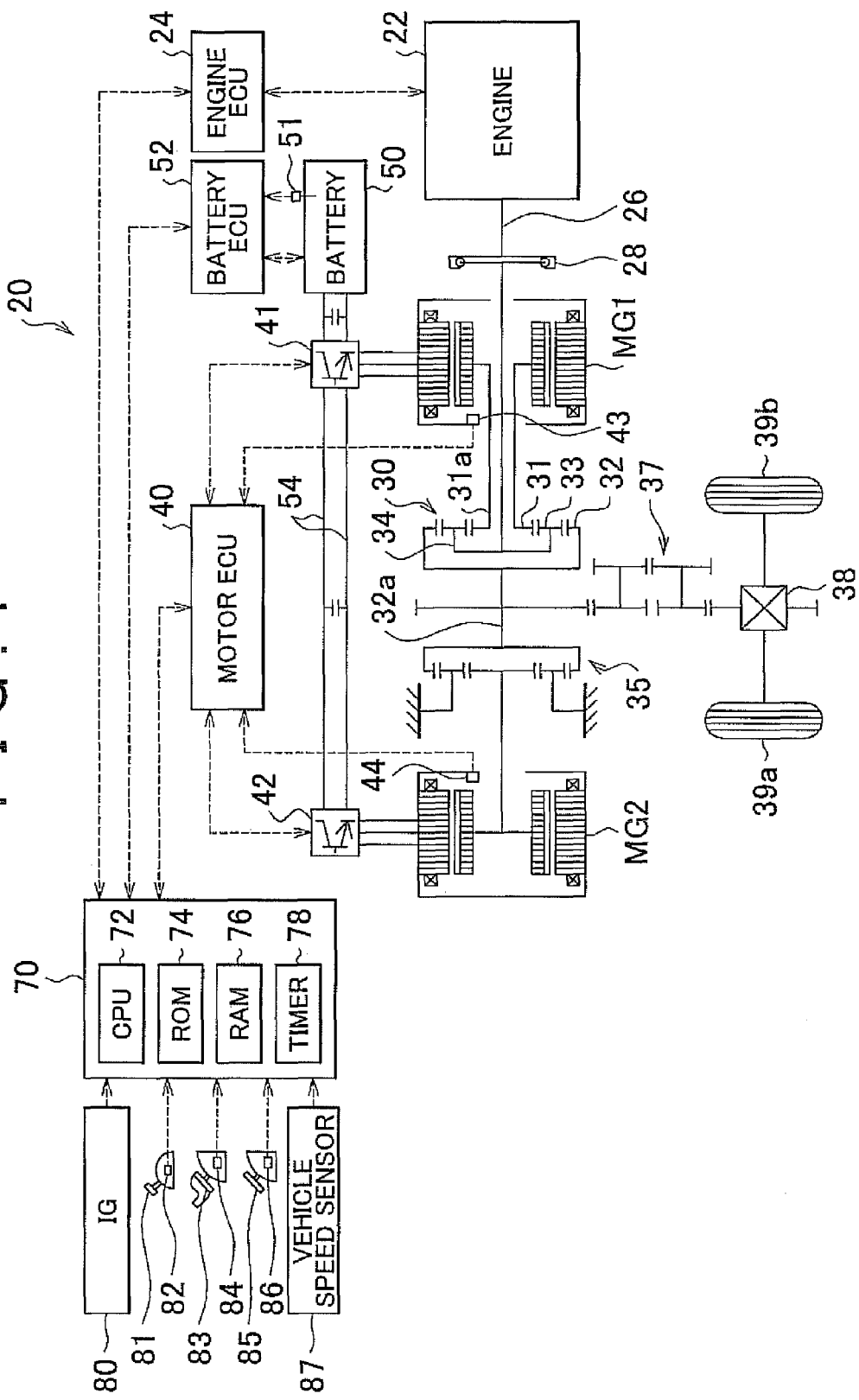
FIG. 1 is a block diagram schematically showing a hybrid vehicle according to a first example embodiment of the invention.

FIG. 1 is a block diagram schematically showing a hybrid vehicle 20 according to a first example embodiment of the invention. The hybrid vehicle 20 shown in the drawing is provided with an engine 22, a three shaft-type power splitting/combining device 30 that is connected via a damper 28 to a crankshaft (an engine shaft) 26 of the engine 22, a motor MG1 that is able to generate power and is connected to the power splitting/combining device 30, a reduction gear 35 that is connected to a ring gear shaft 32a that serves as a drive shaft and is connected to the power splitting/combining device 30, a motor MG2 that is connected to the ring gear shaft 32a via this reduction gear 35, and a hybrid electronic control unit (hereinafter, simply referred to as "hybrid ECU") 70 that controls the overall hybrid vehicle 20, and the like.

The engine 22 is an internal combustion engine that outputs power by combusting a mixture of a hydrocarbon fuel, such as gasoline or light oil, and air inside a combustion chamber 120, and converting the reciprocating motion of a piston 121 that results from the combustion of the air-fuel mixture into rotary motion of the crankshaft 26. In this engine 22, air that has been cleaned by an air-cleaner 122 is drawn into an intake pipe 126 via a throttle valve 123, and fuel such as gasoline is injected from a fuel injection valve 127 into this intake air, as is evident from FIG. 2. The thus obtained air-fuel mixture is then drawn into the combustion chamber 120 via an intake valve 131 that is driven by a valve mechanism 130 structured as a variable valve timing mechanism, and ignited by an electric spark from a spark plug 128 so that it combusts. Exhaust gas from the engine 22 is delivered via an exhaust valve 132 and an exhaust manifold 140 to an exhaust gas control apparatus 141 that includes an exhaust gas control catalyst (i.e., a three-way catalyst) 141c that purifies harmful components such as carbon monoxide (CO), hydrocarbons (HC), and oxides of nitrogen (NOx). After being purified by the exhaust gas control apparatus 141, the exhaust gas is discharged outside. Also, the engine 22 includes an EGR passage 142 that is connected to the exhaust passage downstream of the exhaust gas control apparatus 141 and circulates exhaust gas to a surge tank (i.e., the intake system), an EGR valve 143 that is provided midway in this EGR passage 142 and regulates the recirculation amount (i.e., the EGR amount) of exhaust gas (i.e., EGR gas) that is circulated from the exhaust system to the intake system, and a temperature sensor 144 that detects the temperature of the EGR gas inside the EGR passage 142, and the like.

Figure 2:
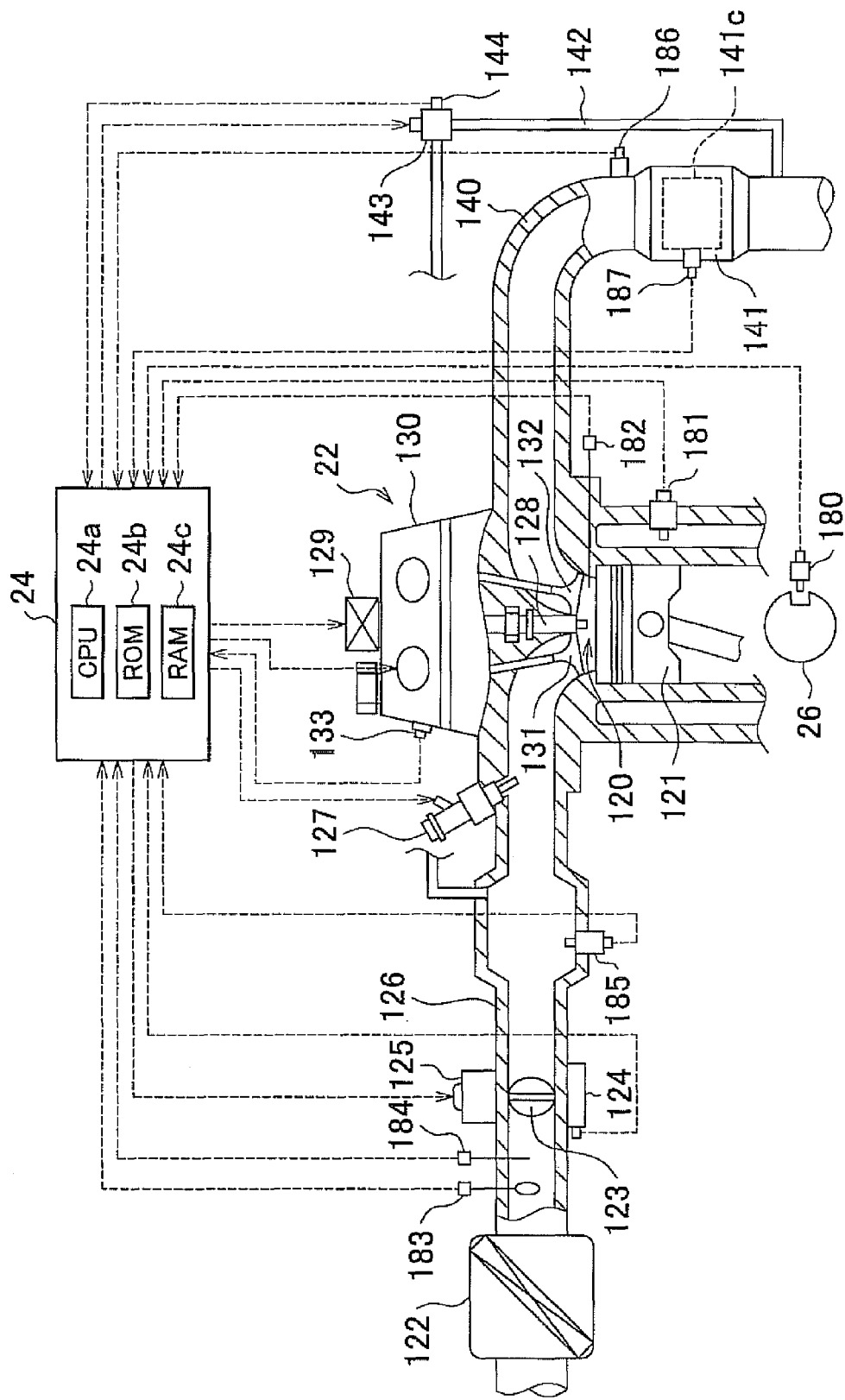
FIG. 2 is a block diagram schematically showing an engine according to the first example embodiment of the invention.
Figure 3:
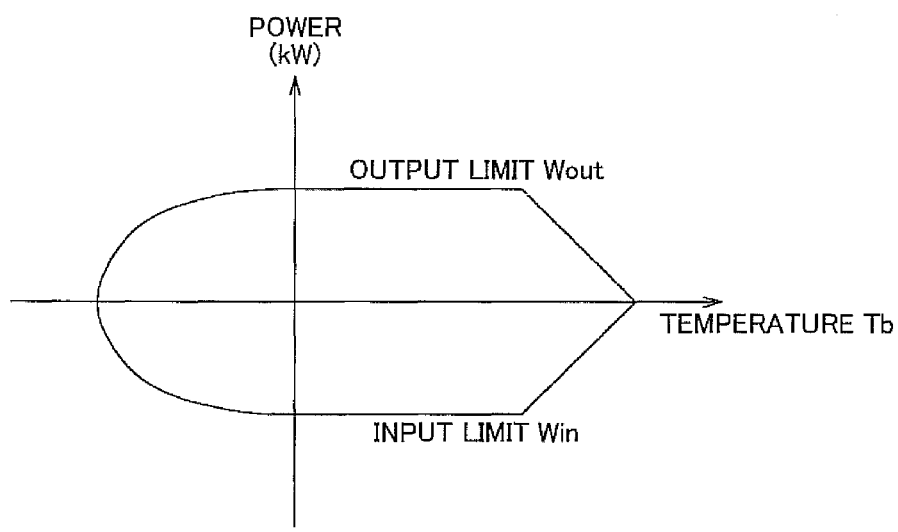
FIG. 3 is a graph showing an example of a relationship between battery temperature and input and output limits of a battery according to the first example embodiment of the invention.
Figure 4:
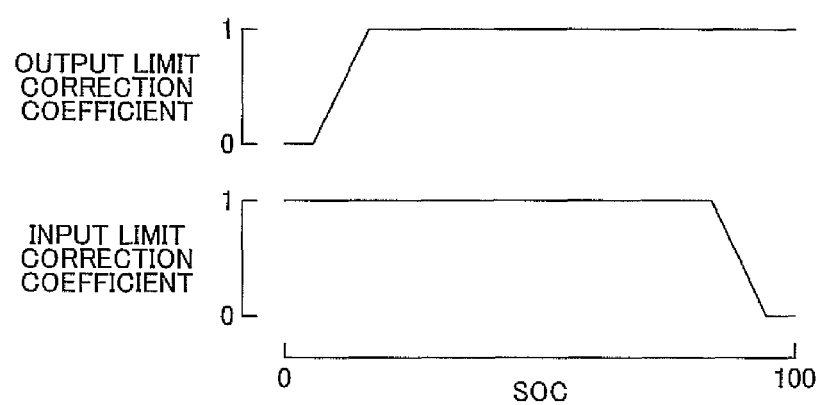
FIG. 4 is a graph showing an example of a relationship between state-of-charge (SOC) of the battery and correction coefficients of the input and output limits according to the first example embodiment of the invention.

The engine 22 structured in this way is controlled by an engine electronic control unit (hereinafter, simply referred to as an "engine ECU") 24. As shown in FIG. 2, the engine ECU 24 is formed as a microprocessor that is centered around a CPU 24a, and includes, in addition to the CPU 24a, ROM 24b that stores various processing programs, RAM 24c that temporarily stores data, and input/output ports and a communication port, not shown, and the like. Signals from various sensors that detect the state of the engine 22 and the like are input to the engine ECU 24 via the input port, not shown. Some examples of these signals include a signal indicative of the crank position from a crank position sensor 180 that detects the rotational position of the crankshaft 26, a signal indicative of the coolant temperature Tw from a coolant temperature sensor 181 that detects the temperature of the coolant of the engine 22, a signal indicative of the cylinder pressure from a cylinder pressure sensor 182 that detects the pressure inside the combustion chamber 120, a signal indicative of the cam position from a cam position sensor 133 that detects the rotational position of a camshaft included in the valve mechanism 130 that drives the intake valve 131 and the exhaust valve 132, and a signal indicative of the throttle position from a throttle valve position sensor 124 that detects the position of the throttle valve 123. Other examples of signals that are input to the engine ECU 24 via the input port include a signal indicative of the intake air amount GA from an airflow meter 183 that detects the intake air amount as the load of the engine 22, a signal indicative of the intake air temperature Tair from an intake air temperature sensor 184 provided in the intake passage 126, a signal indicative of an intake air negative pressure Pi from an intake air pressure sensor 185 that detects negative pressure in the intake passage 126, a signal indicative of the air-fuel ratio AF from an air-fuel ratio sensor 186 arranged upstream of the exhaust gas control apparatus 141 in the exhaust manifold 140, a signal indicative of the catalyst bed temperature Tcat from a catalyst temperature sensor 187 that detects the temperature of the catalyst bed of the exhaust gas control apparatus 141 (i.e., the temperature of the exhaust gas control catalyst 141c), and a signal indicative of the EGR gas temperature from a temperature sensor 144 in the EGR passage 142. Also, various control signals for driving the engine 22 are output via the output port, not shown. Some examples of control signals output from the engine ECU 24 via the output port include a drive signal to a throttle motor 125 that adjusts the position of the throttle valve 123, a drive signal to a fuel injection valve 127, a control signal to an ignition coil 129 that is integrated with an igniter, a control signal to the valve mechanism 130, and a drive signal to the EGR valve 143. Also, the engine ECU 24 calculates the speed Ne of the engine 22 using the crank position from the crank position sensor 180. Further, the engine ECU 24 communicates with the hybrid ECU 70 and controls the operation of the engine 22 according to the control signals from the hybrid ECU 70, as well as outputs data related to the operating state of the engine 22 to the hybrid ECU 70 as necessary.

The power splitting/combining device 30 is a single pinion type planetary gear set that has a sun gear 31 that is a gear with external teeth, a ring gear 32 that is a gear with internal teeth that is arranged concentric with the sun gear 31, and a carrier 34 that pivotally and rotatably retains a plurality of pinion gears 33 that are in mesh with both the sun gear 31 and the ring gear 32, with these three elements, i.e., the sun gear 31, the ring gear 32, and the carrier 34, being able to differentially rotate with respect to one another. A rotating shaft of the motor MG1 is connected to the sun gear 31 that is the first element of the power splitting/combining device 30, the crankshaft 26 of the engine 22 is connected to the carrier 34 which is the second element, and a rotating shaft of the motor MG2 is connected to the ring gear 32 which is the third element via the reduction gear 35 and the ring gear shaft 32a that serves as the drive shaft. When the motor MG1 functions as a generator, the power splitting/combining mechanism 30 distributes the power from the engine 22 that is input from the carrier 34 to the sun gear 31 side and the ring gear 32 side according to the gear ratio of the sun gear 31 and the ring gear 32. When the motor MG1 functions as a motor, the power splitting/combining mechanism 30 combines the power from the engine 22 that is input from the carrier 34 with the power from the motor MG1 that is input from the sun gear 31, and outputs the combined power to the ring gear 32 side. The power output to the ring gear 32 is ultimately output from the ring gear shaft 32a to wheels 39a and 39b, which are driving wheels, via a gear mechanism 37 and a differential gear 38.

The motors MG1 and MG2 are structured as well-known synchronous motor-generators capable of operating as both a generator and a motor, and supply and receive electric power to and from a battery 50, which is a secondary battery, via inverters 41 and 42, respectively. A power line 54 that connects the inverters 41 and 42 to the battery 50 is structured as a positive bus and a negative bus shared by both of the inverters 41 and 42, such that electric power generated by one motor (either the MG1 or the MG2) can be consumed by the other motor. Therefore, the battery 50 is charged by electric power generated by the motor MG1 or MG2 and discharged if the electric power of the motor MG1 or MG2 is insufficient. If the electric power from the motors MG1 and MG2 is balanced, the battery 50 will neither be charged nor discharged. Both of the motors MG1 and MG2 are drivingly controlled by a motor electronic control unit (hereinafter, simply referred to as a "motor ECU") 40. This motor ECU 40 receives signals necessary for drivingly controlling the motors MG1 and MG2, such as signals from rotational position detecting sensors 43 and 44 that detect the rotational position of the rotors of the motors MG1 and MG2, and the phase current applied to the motors MG1 and MG2 that is detected by current sensors, not shown, and the like. The motor ECU 40 outputs switching control signals to the inverters 41 and 42, and the like. The motor ECU 40 also executes a rotation speed calculating routine, not shown, based on the signals received from the rotational position detecting sensors 43 and 44, and calculates the rotation speeds Nm1 and Nm2 of the rotors of the motors MG1 and MG2. Further, the motor ECU 40 communicates with the hybrid ECU 70 and drivingly controls the motors MG1 and MG2 based on control signals and the like from the hybrid ECU 70, as well as outputs data related to the operating states of the motors MG1 and MG2 to the hybrid ECU 70 when necessary.

The battery 50 is structured as a lithium-ion secondary battery or a nickel-metal hydride secondary battery, and is controlled by a battery electronic control unit (hereinafter, simply referred to as a "battery ECU") 52. This battery ECU 52 receives signals necessary for controlling the battery 50, such as a signal indicative of the terminal voltage from a voltage sensor, not shown, arranged between the terminals of the battery 50, a signal indicative of the charge-discharge current from a current sensor, not shown, provided in the power line 54 that is connected to an output terminal of the battery 50, and a signal indicative of the battery temperature Tb from a temperature sensor 51 mounted to the battery 50, and the like. The battery ECU 52 communicates with the hybrid ECU 70 and outputs data related to the state of the battery 50 to the hybrid ECU 70 when necessary. Further, to control the battery 50, the battery ECU 52 calculates the state-of-charge (SOC) based on the integrated value of the charge-discharge current detected by the current sensor, calculates the required charge-discharge electric power Pb* of the battery 50 based on that state-of-charge SOC, and calculates an input limit Win as an allowable charge electric power, which is the amount of electric power allowed to be charged to the battery 50, and an output limit Wout as an allowable discharge electric power, which is the amount of electric power allowed to be discharged from the battery 50, based on the state-of-charge SOC and the battery temperature Tb. Incidentally, the input and output limits Win and Wout of the battery 50 are able to be set by first setting basic values for the input and output limits Win and Wout based on the battery temperature Tb, as well as setting an output limit correction coefficient and an input limit correction coefficient based on the state-of-charge SOC of the battery 50, and then multiplying the basic value of the set input limit Win by the input limit correction coefficient to obtain the input limit Win, and multiplying the basic value of the set output limit Wout by the output limit correction coefficient to obtain the output limit Wout.

The hybrid ECU 70 is formed as a microprocessor that is centered around a CPU 72, and includes, in addition to the CPU 72, ROM 74 that stores processing programs, RAM 76 that temporarily stores data, a timer 78 that measures time according to a timekeeping command, and input/output ports and a communication port, not shown, and the like. Signals from various sensors are input via the input port to the hybrid ECU 70. Some examples of these signals include an ignition signal from an ignition switch (i.e., a start switch) 80, a signal indicative of a shift position SP from a shift position sensor 82 that detects the shift position SP which is the operating position of a shift lever 81, a signal indicative of an accelerator operation amount Acc from an accelerator pedal position sensor 84 that detects the depression amount of an accelerator pedal 83, a signal indicative of a brake pedal stroke BS from a brake pedal stroke sensor 86 that detects the depression amount of a brake pedal 85, and a signal indicative of the vehicle speed V from a vehicle speed sensor 87, and the like. As described above, the hybrid ECU 70 is connected to the engine ECU 24, the motor ECU 40, and the battery ECU 52 and the like via the communication port, and sends and receives various control signals and data to and from the engine ECU 24, the motor ECU 40, and the battery ECU 52 and the like.

In the hybrid vehicle 20 structured as described above, the required torque Tr* to be output to the ring gear shaft 32a that serves as the drive shaft is calculated based on the vehicle speed V and the accelerator operation amount Acc that corresponds to the depression amount of the accelerator pedal 83 by the driver. The engine 22 and the motors MG1 and MG2 are controlled such that torque based on this required torque Tr* is output to the ring gear shaft 32a. Some examples of operation control modes of the engine 22 and the motors MG1 and MG2 are i) a torque converting operating mode, ii) a charge-discharge operating mode, and iii) a motor operating mode. In the torque converting operating mode, the engine 22 is controlled to output power comparable to the required torque Tr*, and the motors MG1 and MG2 are controlled to output all of the power output from the engine 22 to the ring gear shaft 32a after it has been converted to torque by the power splitting/combining device 30, the motor MG1, and the motor MG2. In the charge-discharge operating mode, the engine 22 is controlled to output power comparable to the sum of the required torque Tr* and the electric power needed to be charged or discharged to or from the battery 50, and the motors MG1 and MG2 are controlled to output torque based on the required torque Tr* to the ring gear shaft 32a after all or some of the power output from the engine 22 with the charge-discharge of the battery 50 is converted to torque by the power splitting/combining device 30 and the motors MG1 and MG2. In the motor operating mode, the engine 22 is stopped and the motor MG2 is controlled to output torque based on the required torque Tr* to the ring gear shaft 32a. Also, in the hybrid vehicle 20 of this example embodiment, when a predetermined condition is satisfied in the torque converting operating mode or the charge-discharge operating mode, intermittent operation is executed in which the engine 22 is automatically stopped and started.

Furthermore, with the hybrid vehicle 20 in this first example embodiment, a catalyst degradation suppression determining routine, not shown, is executed by the engine ECU 24. If the temperature of the exhaust gas control catalyst 141c increases such that the catalyst bed temperature Tcat of the exhaust gas control apparatus 141 becomes equal to or greater than a first temperature, a predetermined catalyst degradation suppression flag Fc is set to a value of 1 until the catalyst bed temperature Tcat falls below a second temperature that is lower than the first temperature. When the catalyst degradation suppression flag Fc is set to a value of 1, a fuel cut in the engine 22 is prohibited to suppress the catalyst bed temperature from further increasing due to large amounts of air being supplied to the hot exhaust gas control catalyst 141c, when there is a demand to decelerate the hybrid vehicle 20 (i.e., the ring gear shaft 32a) by the driver releasing (i.e., letting up on) the accelerator pedal 83 or depressing the brake pedal 85, so that the catalyst bed temperature will not further increase and degrade the exhaust gas control catalyst 141c. That is, when the catalyst degradation suppression flag Fc is set to a value of 1, fuel is injected into the combustion chambers 120 and the air-fuel mixture is ignited even if ordinarily a fuel cut in the engine 22 should be executed.

Next, operation of the hybrid vehicle 20 when the catalyst degradation suppression flag Fc described above is set to a value of 1 will be described. More particularly, operation of the hybrid vehicle 20 when the driver releases (i.e., lets up on) the accelerator pedal 83 when the catalyst degradation suppression flag Fc is set to a value of 1 will be described.

Figure 5:
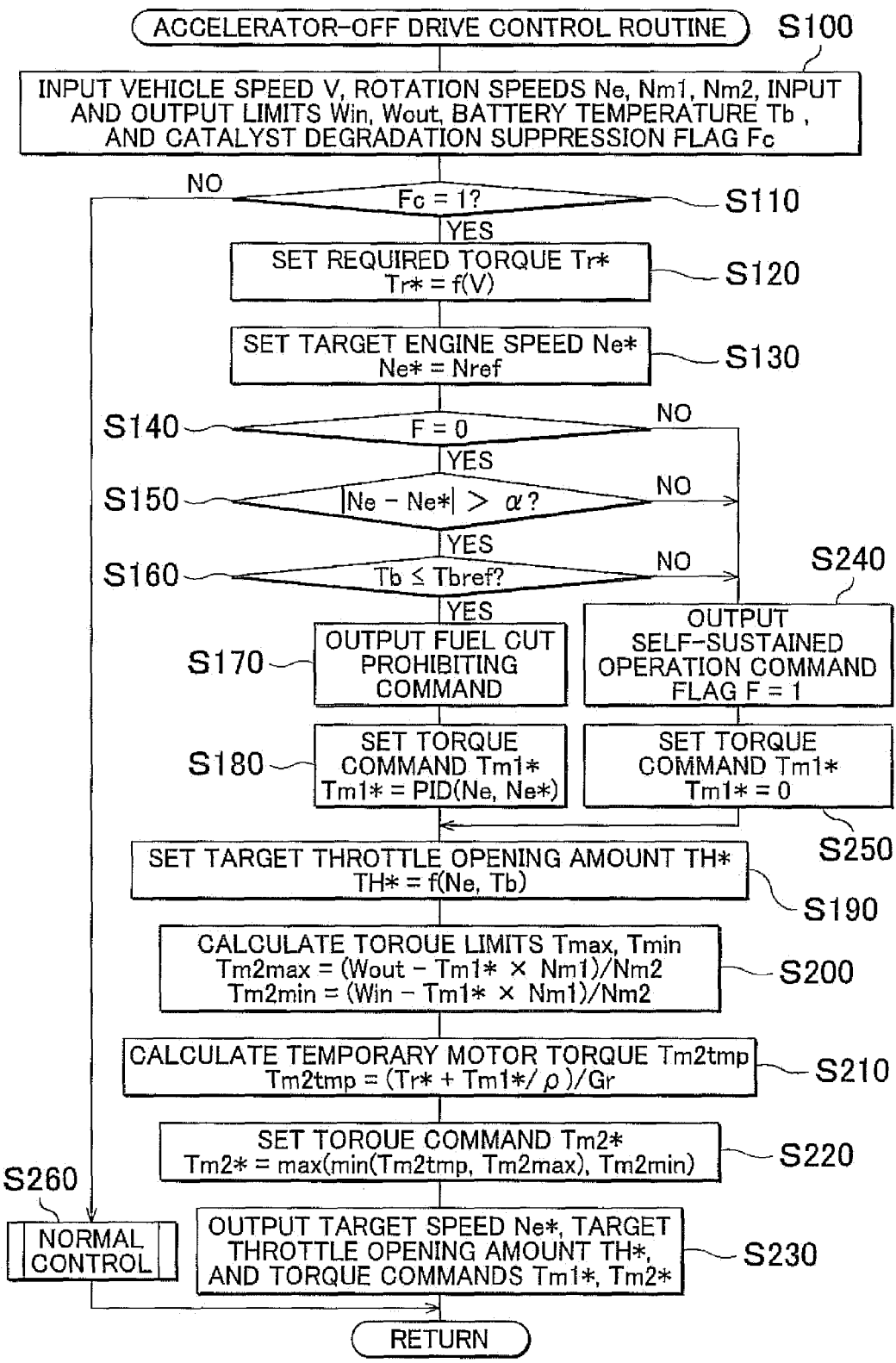
FIG. 5 is a flowchart illustrating an example of an accelerator-off drive control routine that is executed by a hybrid ECU according to the first example embodiment of the invention.

FIG. 5 is a flowchart of an example of an accelerator-off drive control routine that is executed at predetermined intervals of time (such as every several milliseconds) by the hybrid ECU 70 of the first example embodiment when the driver releases the accelerator pedal 83 while the drive position for normal forward running is selected as the shift position. When the routine in FIG. 5 starts, the CPU 72 of the hybrid ECU 70 inputs data necessary for control, such as the vehicle speed V from the vehicle speed sensor 87, the speed Ne of the engine 22, the rotation speeds Nm1 and Nm2 of the motors MG1 and MG2, the input and output limits Win and Wout of the battery 50, the temperature Tb of the battery 50, and the value of the catalyst degradation suppression flag Fc (step S100). Here, the speed Ne of the engine 22 is calculated by the engine ECU 24 based on the crank position from the crank position sensor 180 and input to the hybrid ECU 70 through communication from the engine ECU 24. Also, the rotation speeds Nm1 and Nm2 of the motors MG1 and MG2 are calculated by the motor ECU 40 based on the signals from the rotational position detecting sensors 43 and 44 and input to the hybrid ECU 70 through communication from the motor ECU 40. Furthermore, the input and output limits Win and Wout and the battery temperature Tb are input to the hybrid ECU 70 through communication from the battery ECU 52. The catalyst degradation suppression flag Fc is input to the hybrid ECU 70 through communication from the engine ECU 24. After the data is input in step S100, it is determined whether the input catalyst degradation suppression flag Fc is a value of 1 (step S110). If the catalyst degradation suppression flag Fc is a value of 0, in which it is regarded that there is no fear of degradation of the exhaust gas control catalyst 141c, normal accelerator-off control is executed (step S260) and this cycle of the routine ends.

Figure 6:
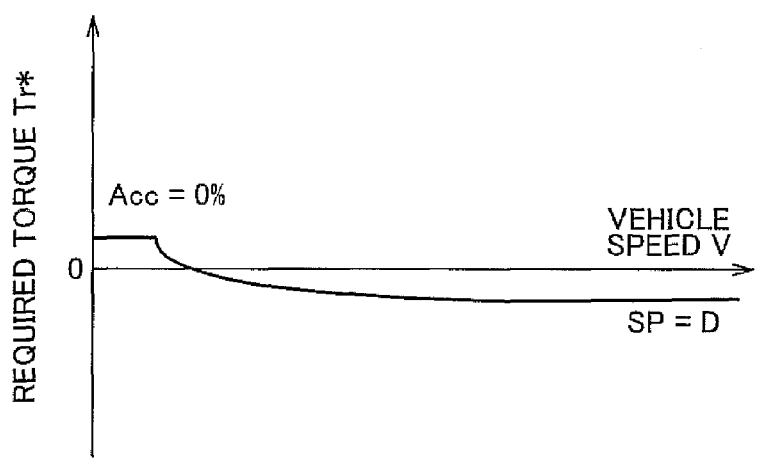
FIG. 6 is a view of an example of a required torque setting map according to the first example embodiment of the invention.

Also, if it is determined that the catalyst degradation suppression flag Fc is a value of 1 in step S110, the required torque Tr* to be output to the ring gear shaft 32a is set based on the vehicle speed V input in Step S100 (step S120). In this first example embodiment, the relationship between the required torque Tr* and the vehicle speed V when the accelerator is off, i.e., when the accelerator operation amount Acc is a value of 0, is preset and stored in the ROM 74 in the form of a required torque setting map. A required torque Tr* that corresponds to a given vehicle speed V is derived and set from this map. FIG. 6 shows one example of a required torque setting map used when the accelerator is off. Next, a target speed Ne* of the engine 22 is set to a preset self-sustaining speed Nref (step S130). This self-sustaining speed Nref is a speed at which the engine 22 is operated so that it outputs essentially no torque while fuel continues to be injected into the combustion chambers 120 and the air-fuel mixture continues to be ignited, after the catalyst degradation suppression flag Fc has been set to a value of 1 and a fuel cut in the engine 22 has been prohibited. In this first example embodiment, this self-sustaining speed Nref is set to idling speed or a value near there (such as 800 to 1200 rpm, for example).

Once the target speed Ne* of the engine 22 is set, it is then determined whether a predetermined flag F is a value of 0 (step S140). If the flag F is a value of 0, it is then determined whether the absolute value of the difference between the speed Ne of the engine 22 input in step S100 and the target speed Ne* is greater than a predetermined value α (such as a value of approximately 50 rpm, for example) (step S150). If the absolute value of the difference between the speed Ne and the target speed Ne* is greater than the predetermined value α, it is then determined whether the battery temperature Tb input in step S100 is equal to or lower than a preset reference temperature Tbref (step S160). This reference temperature Tbref is an upper limit temperature when the input limit Win, which is the amount of electric power allowed to be charged to the battery 50, is not limited to a small amount of charge electric power by the relationship with the battery temperature Tb. This reference temperature Tbref is set to a value of approximately 40° C., for example. If the battery temperature Tb is equal to or lower than the reference temperature Tbref, a fuel cut prohibiting command to prohibit the injection of fuel into the combustion chambers 120 from being stopped, i.e., to prohibit a fuel cut, is output to the engine ECU 20 (step S170). Then, a torque command Tm1* for the motor MG1 is set according to Expression (1) below to reduce the speed Ne of the engine 22 by outputting negative torque from the motor MG1 to the crankshaft 26 (step S180). Here, Expression (1) is a relational expression of feedback control for reducing the speed Ne of the engine 22 to the target speed Ne* (i.e., the self-sustaining speed Nref) while fuel continues to be supplied to the engine 22, i.e., while the engine 22 continues to fire. In Expression (1), the first term on the right side, k1, is a proportional term of the gain, and the second term on the right side, k2, is an integral term of the gain. These gains k1 and k2 are set to small values compared with when a relatively large amount of torque is being output from the engine 22, because it is necessary to keep the engine 22 firing.

$$Tm1^* = k1 \times (Ne^* - Ne) + k2 \times \int (Ne^* - Ne) dt \qquad (1)$$

Figure 7:
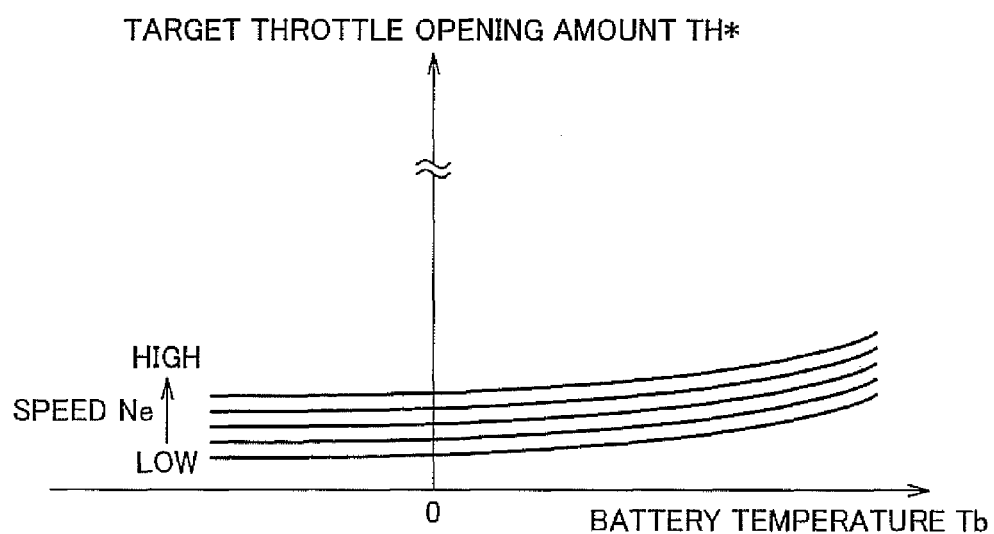
FIG. 7 is a view of an example of a target throttle opening amount setting map according to the first example embodiment of the invention.

Continuing on, a target throttle opening amount TH* of the throttle valve 123 of the engine 22 is set based on the battery temperature Tb and the speed Ne of the engine 22 input in step S100 (step S190). In this first example embodiment, the relationships among the speed Ne of the engine 22, the battery temperature Tb, and the target throttle opening amount TH* are set beforehand and stored in the ROM 74 in the form of a target throttle opening amount setting map. A target throttle opening amount TH* that corresponds to a given speed Ne and a given battery temperature Tb is derived and set from this map. FIG. 7 shows an example of a target throttle opening amount setting map. The target throttle opening amount setting map in the first example embodiment defines the target throttle opening amount TH* such that the amount of air that is drawn into the engine 22 is greater than the amount of intake air required during self-sustained operation at the self-sustaining speed Nref but less than the amount of intake air required when operating under a load at the self-sustaining speed Nref. As shown in FIG. 7, the intake air amount tends to be increased as the speed Ne of the engine 22 increases, and also tends to be increased as the battery temperature Tb increases.

Figure 8:
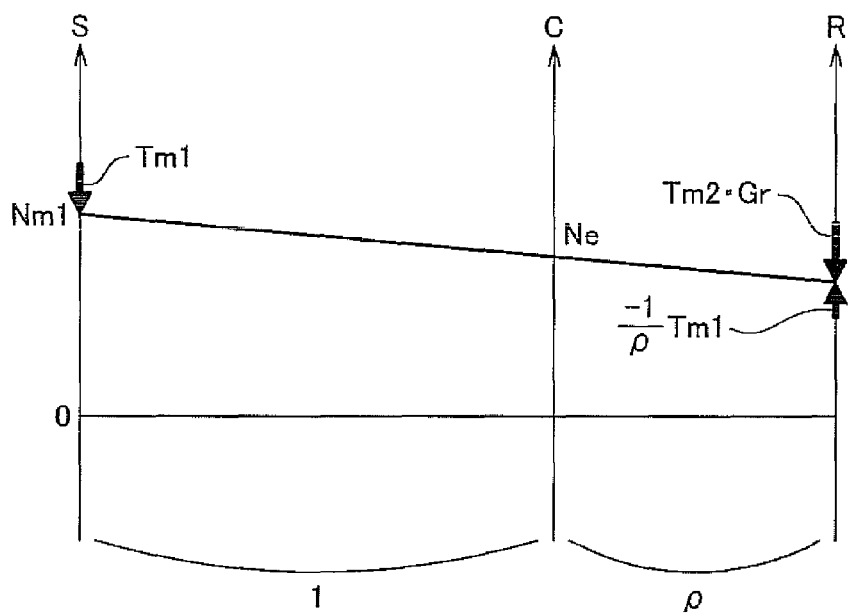
FIG. 8 is a view of an example of an alignment graph that shows the dynamic relationship between rotation speed and torque of rotating elements in a power splitting/combining device according to the first example embodiment of the invention.

After step S190, torque limits Tmin and Tmax are calculated according to Expressions (2) and (3), respectively, as upper and lower limits for the torque that may be output from the motor MG2, using the input and output limits Win and Wout of the battery 50, the torque command Tm1* for the motor MG1 set in step S180, and the current rotation speeds Nm1 and Nm2 of the motors MG1 and MG2 (step S200). Moreover, a temporary motor torque Tm2tmp, which is a temporary value of the torque that should be output from the motor MG2, is calculated according to Expression (4) below using the required torque Tr*, the torque command Tm1*, the gear ratio ρ of the power splitting/combining device 30, and the gear ratio Gr of the reduction gear 35 (step S210). Then the torque command Tm2* for the motor MG2 is set to a value that the temporary motor torque Tm2tmp is limited to by the torque limits Tmin and Tmax (step S220). Setting the torque command Tm2* for the motor MG2 in this way enables the torque that is output to the ring gear shaft 32a to be limited to within the input and output limits Win and Wout of the battery 50. Here, Expression (4) is a dynamic relational expression for the rotating elements of the power splitting/combining device 30. FIG. 8 is an example of an alignment graph that shows the dynamic relationship between rotation speed and torque of the rotating elements in the power splitting/combining device 30. In the drawing, the S axis on the left side represents the rotation speed of the sun gear 31 that matches the rotation speed Nm1 of the motor MG1, the C axis in the center represents the rotation speed of the carrier 34 that matches the speed Ne of the engine 22, and the R axis on the right side represents the rotation speed Nr of the ring gear 32, which is equal to the rotation speed Nm2 of the motor MG2 divided by the gear ratio Gr of the reduction gear 35. Also, the two bold arrows on the R axis indicate the torque that acts on the ring gear shaft 32a from the torque output when the torque Tm1 is output by the motor MG1, and the torque that acts on the ring gear shaft 32a via the reduction gear 35 when the torque Tm2 is output by the motor MG2. Expression (4) for obtaining the temporary motor torque Tm2tmp can be derived easily using the relationships of the rotation speeds in this alignment graph. Once the target speed Ne* and target throttle opening amount TH* of the engine 22 and the torque commands Tm1* and Tm2* for the motors MG1 and MG2 have been set in this way, the target speed Ne* and the target throttle opening amount TH* are output to the engine ECU 24, and the torque commands Tm1* and Tm2* for the motors MG1 and MG2 are output to the motor ECU 40 (step S230). Then this cycle of the routine ends.

$$Tmin=(Win-Tm1^* \times Nm1)/Nm2 \quad (2)$$

$$Tmax=(Wout-Tm1^* \times Nm1)/Nm2 \quad (3)$$

$$Tm2tmp=(Tr^*+Tm1^*/\rho)/Gr \quad (4)$$

After receiving the fuel cut command, the target speed Ne*, and the target throttle opening amount TH* from the hybrid ECU 70, the engine ECU 24 controls the throttle motor 125 based on the throttle position obtained by the throttle valve position sensor 124, so that the opening amount of the throttle valve 123 comes to match the target throttle opening amount TH*. Moreover, the engine ECU 24 uses the target throttle opening amount TH*, the speed Ne, and a preset map, not shown, and the like to obtain the fuel injection quantity at which the speed Ne can be quickly reduced by outputting torque from the motor MG1 to the crankshaft 26, while keeping the engine 22 firing to suppress degradation of the exhaust gas control catalyst 141c. The engine ECU 24 then executes fuel injection control to supply the obtained quantity of fuel to the combustion chambers 120, as well as ignition timing control to keep the engine 22 firing. Also, after receiving the torque commands Tm1* and Tm2*, the motor ECU 40 performs switching control of the switching elements of the inverters 41 and 42 to drive the motor MG1 according to the torque command Tm1* and drive the motor MG2 according to the torque command Tm2*. Therefore, if the battery temperature Tb is equal to or lower than the reference temperature Tbref, the speed Ne of the engine 22 can be quickly reduced to the target speed Ne* (i.e., the self-sustaining speed Nref) while fuel continues to be supplied to the engine 22, i.e., while the engine 22 is kept firing.

If, on the other hand, the determinations in steps S140 and S150 are yes but then it is determined in step S160 that the battery temperature Tb input in step S100 is above the reference temperature Tbref, a self-sustained operation command is output to the engine ECU 24 and the flag F described above is set to a value of 1 (i.e., step S240), and furthermore, the torque command Tm1* for the motor MG1 is set to a value of 0 (step S250). Then steps S190 to S220 described above are executed, after which the target speed Ne* and the target throttle opening amount TH* are output to the engine ECU 24 while the torque commands Tm1* and Tm2 for the motors MG1 and MG2 are output to the motor ECU 40 (step S230). Then this cycle of the routine ends. In this case, the battery temperature Tb exceeds the reference temperature Tbref, so in step S190 the target throttle opening amount TH* is set relatively large compared to when the battery temperature Tb is relatively low (particularly when the battery temperature Tb is equal to or lower than the reference temperature Tbref).

After receiving the self-sustained operation command, the target speed Ne*, and the target throttle opening amount TH* from the hybrid ECU 70, the engine ECU 24 controls the throttle motor 125 based on the throttle position obtained by the throttle valve position sensor 124 so that the opening amount of the throttle valve 123 comes to match the target throttle opening amount TH*. Moreover, the engine ECU 24 uses the target throttle opening amount TH*, the speed Ne, and a preset map, not shown, and the like to set the minimum amount of fuel that must be injected in order to keep the engine 22 firing to suppress degradation of the exhaust gas control catalyst 141c. The engine ECU 24 then executes fuel injection control to supply the set quantity of fuel into the combustion chambers 120, as well as ignition timing control to keep the engine 22 firing. Also, after receiving the torque commands Tm1* and Tm2*, the motor ECU 40 performs switching control of the switching elements of the inverters 41 and 42 to drive the motor MG1 according to the torque command Tm1* and drive the motor MG2 according to the torque command Tm2*. In this case, no torque is output from the motor MG1 to the crankshaft 26, but in step S190 as described above, the target throttle opening amount TH* is set large compared to when the battery temperature Tb is relatively low. Therefore, friction is increased by this setting of the target throttle opening amount TH*, i.e., the intake air adjustment, thereby promoting a decrease in the speed of the engine 22. As a result, the speed Ne of the engine 22 is able to be quickly decreased to the target speed Ne* (i.e., the self-sustaining speed Nref) while fuel continues to be supplied to the engine 22, i.e., while the engine 22 is kept firing.

In this way, after the flag F is set to a value of 1 in step S240, the determination in step S140 thereafter, i.e., during the next cycle of the routine, will be no, so steps S240, S250, and S190 to S230 will be executed. Also, if the battery temperature Tb is equal to or lower than the reference temperature Tbref such that steps S170 to S230 described above are executed, and it is determined in step S150 thereafter, i.e., during the next cycle of the routine, that the absolute value of the difference between the speed Ne of the engine 22 and the target speed Ne* is equal to or less than the predetermined value α and the speed Ne substantially matches the target speed Ne*, then steps S240, S250, and S190 to S230 will be executed.

As described above, with the hybrid vehicle according to this first example embodiment, the engine 22, the motor MG1, and the motor MG2 are controlled such that torque based on the required torque Tr* is output to the ring gear shaft 32a and the speed Ne of the engine 22 is decreased to the preset self-sustaining speed Nref with the setting of the target throttle opening amount TH* that increases the intake air amount of the engine 22 as the battery temperature Tb increases (i.e., with the intake air adjustment) and the injection of fuel into the combustion chambers 120 (and the ignition of that fuel), when there is a demand to decelerate the ring gear shaft 32a by the driver releasing the accelerator pedal 83 while the catalyst degradation suppression flag Fc is set to a value of 1 and a fuel cut in the engine 22 is being prohibited to suppress degradation of the exhaust gas control catalyst 141c (steps S170 to S250).

That is, with the hybrid vehicle 20 according to the first example embodiment, when the battery temperature Tb is equal to or lower than the preset reference temperature Tbref when there is a demand to decelerate the ring gear shaft 32a while the catalyst degradation suppression flag Fc is set to a value of 1 and a fuel cut is being prohibited, the engine 22 and the motors MG1 and MG2 are controlled such that torque based on the required torque Tr* is output to the ring gear shaft 32a and the speed Ne of the engine 22 decreases to the self-sustaining speed Nref with the output of negative torque from the motor MG1 to the crankshaft 26, the setting of the target throttle opening amount TH* in step S190, and the injection of fuel into the combustion chambers 120 (and the ignition of that fuel) (step S170 to S230). As a result, if the battery temperature Tb is relatively low such that the input limit Win of the battery 50 is not limited to a small amount of charge electric power by the relationship with the battery temperature Tb, the motor MG1 is made to function as a generator, so the speed Ne of the engine 22 can be quickly decreased by outputting negative torque from the motor MG1 to the crankshaft 26.

On the other hand, if the battery temperature Tb is above the reference temperature Tbref when there is a demand to decelerate the ring gear shaft 32a while the catalyst degradation suppression flag Fc is set to a value of 1 and a fuel cut is being prohibited, the engine 22 and the motors MG1 and MG2 are controlled such that torque based on the required torque Tr* is output to the ring gear shaft 32a and the speed Ne of the engine 22 is decreased to the self-sustaining speed Nref with the setting of the target throttle opening amount TH* that increases the intake air amount of the engine 22 as the battery temperature Tb increases, and the injection of fuel into the combustion chambers 120 (and the ignition of that fuel), without outputting torque from the motor MG1 (steps S240, S250, and S190 to S230). Therefore, even if the speed Ne of the engine 22 stops being decreased by the motor MG1 taking into account the fact that the battery temperature Tb is relatively high such that the input limit Win of the battery 50 is limited to a small amount of charge electric power by the relationship with the battery temperature Tb, it is still possible to promote a decrease in the speed of the engine 22 by increasing the friction by the setting of the target throttle opening amount TH* (i.e., the intake air adjustment) in step S190. Therefore, with the hybrid vehicle 20 according to this first example embodiment, the speed Ne of the engine 22 can be quickly decreased regardless of the state of the battery 50, when there is a demand to decelerate the ring gear shaft 32a while a fuel cut in the engine 22 is being prohibited to suppress degradation of the exhaust gas control catalyst 141c. This kind of control is extremely useful for quickly decreasing the speed Ne of the engine 22 particularly when the accelerator pedal 83 is released while the engine 22 is operating at a high load and high speed.

Figure 9:
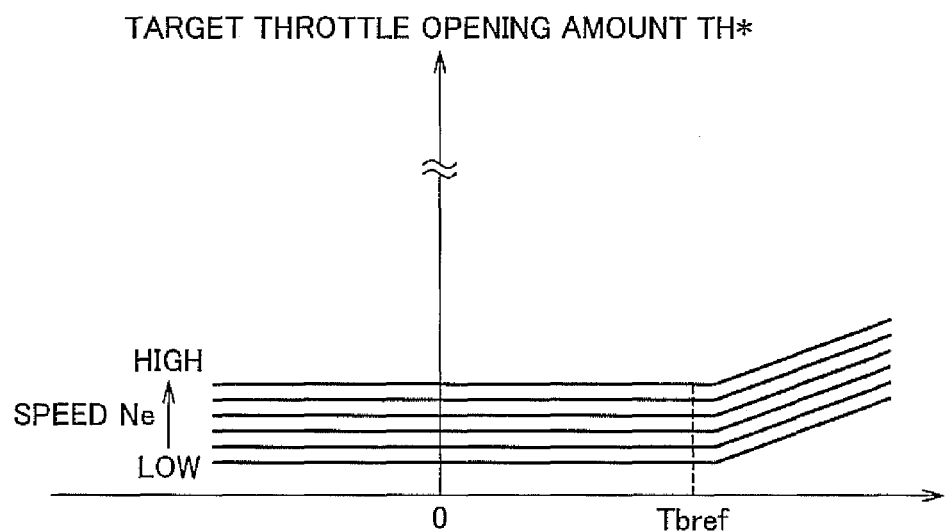
FIG. 9 is a view of another example of a target throttle opening amount setting map according to the first example embodiment of the invention.

Also, in step S190 in the first example embodiment, the target throttle opening amount TH* is set as the control amount of the throttle valve 123 using the speed Ne of the engine 22, the battery temperature Tb, and a target throttle opening amount setting map (FIG. 7) as a restriction in which there is a tendency to increase the intake air amount as the speed Ne increases, and increase the intake air amount as the battery temperature Tb increases. As a result, it is possible to more accurately adjust the intake air when there is a demand to decelerate the ring gear shaft 32a while a fuel cut in the engine 22 is being prohibited to suppress degradation of the exhaust gas control catalyst 141c. However, the target throttle opening amount setting map is not limited to the map shown in FIG. 7. For example, the target throttle opening amount setting map may also be a map such as that shown in FIG. 9, in which there is a tendency to increase the intake air amount as the speed Ne increases without relying on the battery temperature Tb when the battery temperature Tb is equal to or lower than the reference temperature Tbref, and increase the intake air amount as the battery temperature Tb increases as well as increase the intake air amount as the speed Ne increases when the battery temperature Tb is above the reference temperature Tbref. That is, the intake air amount may be set based on the speed Ne of the engine 22 without using the battery temperature Tb when the battery temperature Tb is equal to or lower than the reference temperature Tbref and the speed Ne of the engine 22 is decreased with the output of negative torque from the motor MG1 to the crankshaft 26.

Figure 10:
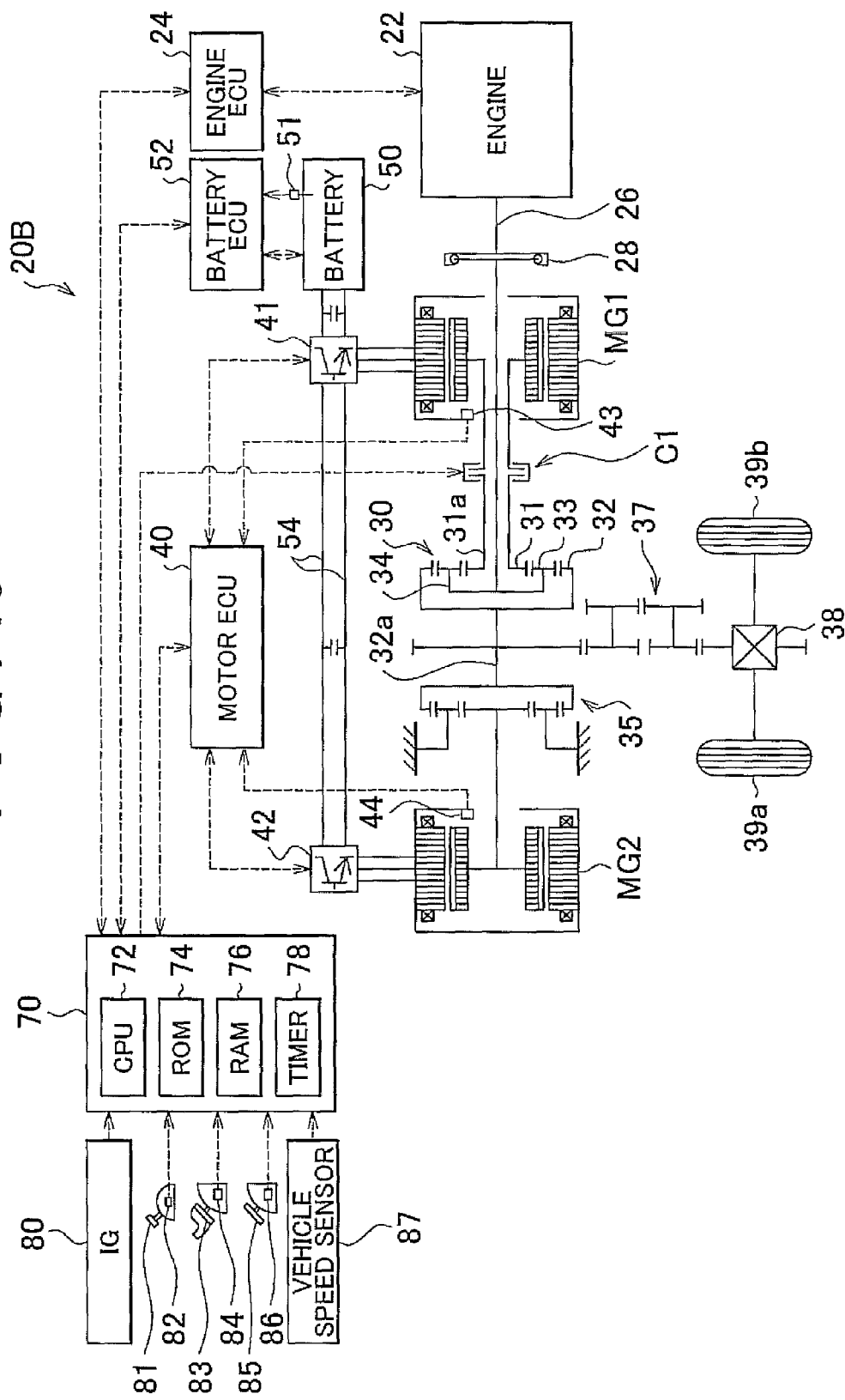
FIG. 10 is a block diagram schematically showing a hybrid vehicle according to a second example embodiment of the invention.

FIG. 10 is a block diagram schematically showing a hybrid vehicle 20B according to a second example embodiment of the invention. Incidentally, structural elements of the hybrid vehicle 20B according to this second example embodiment that are the same as those of the hybrid vehicle 20 according to the first example embodiment will be denoted by like reference characters and redundant descriptions of those elements will be omitted. The hybrid vehicle 20B shown in FIG. 10 is provided with a clutch C1 capable of selectively connecting and disconnecting the rotating shaft of the motor MG1 to and from the sun gear 31 of the power splitting/combining device 30. This clutch C1 is driven by a hydraulic actuator, an electromagnetic actuator, or an electric actuator, not shown, that is controlled by the hybrid ECU 70. In the hybrid vehicle 20B provided with this kind of clutch C1, if the battery temperature Tb is equal to or lower than the preset reference temperature Tbref when there is a demand to decelerate the ring gear shaft 32a while the catalyst degradation suppression flag Fc is set to a value of 1 and a fuel cut is being prohibited, the engine 22 and the motors MG1 and MG2 are controlled such that torque based on the required torque Tr* is output to the ring gear shaft 32a and the speed Ne of the engine 22 is decreased to the self-sustaining speed Nref with the output of negative torque from the motor MG1 to the crankshaft 26, the same setting of the target throttle opening amount TH* as that in step S190 described above, and the injection of fuel into the combustion chambers 120 (and the ignition of that fuel), just as in the hybrid vehicle 20 described above.

On the other hand, if the battery temperature Tb is above the reference temperature Tbref when there is a demand to decelerate the ring gear shaft 32a while the catalyst degradation suppression flag Fc is set to a value of 1 and a fuel cut is being prohibited, the clutch C1 is controlled to disconnect the rotating shaft of the motor MG1 from the power splitting/combining device 30, and the engine 22 and the motors MG1 and MG2 are controlled such that torque based on the required torque Tr* is output to the ring gear shaft 32a while the speed Ne of the engine 22 is decreased to the self-sustaining speed Nref with the setting of the target throttle opening amount TH* that increases the intake air amount of the engine 22 as the battery temperature Tb increases (i.e., with the intake air adjustment) and the injection of fuel into the combustion chambers 120 (and the ignition of that fuel). Therefore, even if the speed Ne of the engine 22 stops being decreased by the motor MG1 taking into account the fact that the battery temperature Tb is relatively high such that the input limit Win is limited to a small amount of charge electric power, it is still possible to both prevent the speed of the engine 22 from decreasing by disconnecting the rotating shaft of the motor MG1 from the power splitting/combining device 30 and using the inertia of the rotating shaft of the motor MG1, and quickly decrease in the speed Ne of the engine 22 by increasing the friction by the kind of setting of the target throttle opening amount TH* (i.e., the intake air adjustment) described above. However, in the hybrid vehicle 20B provided with the clutch C1 described above, the intake air adjustment described above before and after the motor MG1 is disconnected from the power splitting/combining device 30 by the clutch C1 may also be omitted.

Figure 11:
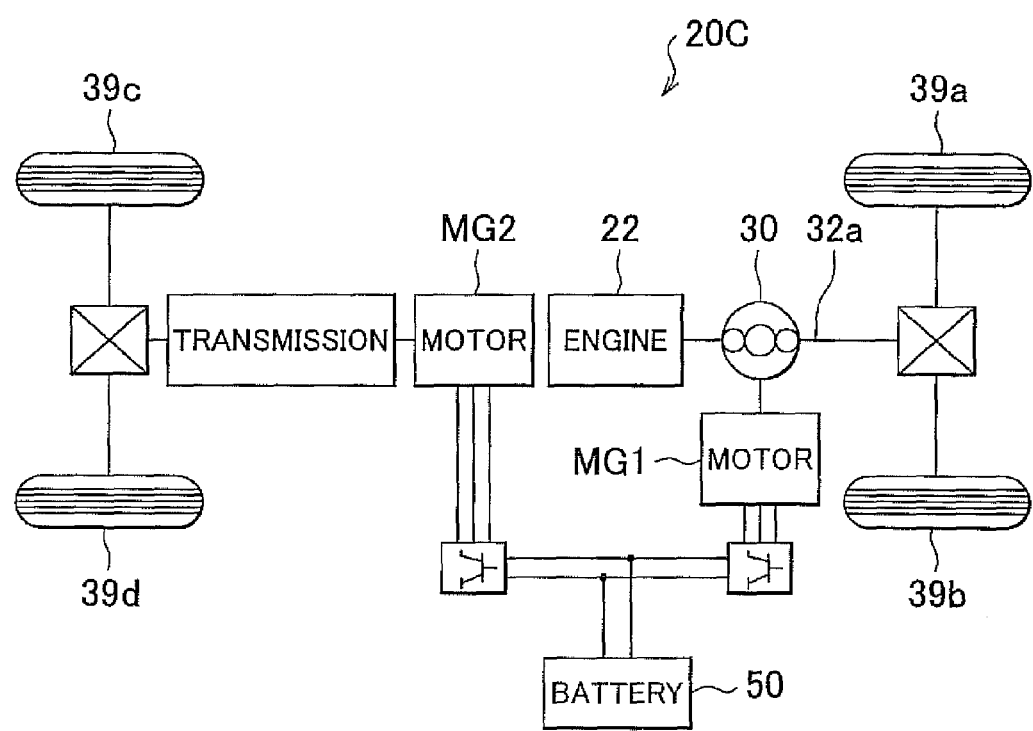
FIG. 11 is a block diagram schematically showing a hybrid vehicle according to a third example embodiment of the invention.

Incidentally, thus far an example embodiment of the invention has been described illustrating a case in which the driver has released the accelerator pedal 83 when the catalyst degradation suppression flag Fc is set to a value of 1. Of course, the invention may similarly be applied to both a case in which the driver has depressed the accelerator pedal 83 again and a case in which the driver has depressed the brake pedal 85. Also, with the hybrid vehicles 20 and 20B according to the first and second example embodiments, the ring gear shaft 32a that serves as the drive shaft is coupled to the motor MG2 via the reduction gear 35 that reduces the rotation speed output from the motor MG2 and transmits it to the ring gear shaft 32a. However, instead of the reduction gear 35, a transmission may also be employed that has two speeds, such as Hi and Lo, or three or more speeds, and changes the rotation speed output from the motor MG2 and transmits the changed rotation speed to the ring gear shaft 32a. Moreover, the hybrid vehicle 20 of the first example embodiment outputs the power of the motor MG2 to the ring gear shaft 32a that is connected to the ring gear 32 of the power splitting/combining device 30. However, the invention is not limited to this structure. That is, the invention may also be applied to a structure that outputs the power of the motor MG2 to a shaft (e.g., a shaft that is connected to the wheels 39c and 39d in FIG. 11) other than the ring gear shaft 32a (i.e., the wheels 39a and 39b), as in a hybrid vehicle 20C according to a third example embodiment of the invention shown in FIG. 11.

Incidentally, in the foregoing example embodiments, the engine 22 corresponds to an internal combustion engine. Also, the exhaust gas control apparatus 141 that includes the exhaust gas control catalyst 141c for purifying exhaust gas discharged from the engine 22 corresponds to an exhaust gas control apparatus. Also, the motor MG1 that both inputs and outputs power corresponds to a first electric motor. Further, the power splitting/combining device 30 that is connected to the crankshaft 26 of the engine 22, the rotating shaft of the motor MG1, and the ring gear shaft 32a that serves as the drive shaft, and inputs and outputs power that is based on the power input and output from and to two of these three shafts to the remaining shaft corresponds to a power distributing portion. Also, the motor MG2 that outputs power to the ring gear shaft 32a corresponds to a second electric motor. Further, the battery 50 that supplies and receives electric power to and from the motors MG1 and MG2 corresponds to a power storage device. The hybrid ECU 70 that executes step S120 in FIG. 5 corresponds to a required torque setting portion. The combination of the hybrid ECU 70, the engine ECU 24, and the motor ECU 40 that control the engine 22 and the motors MG1 and MG2 such that torque based on the required torque Tr* is output to the ring gear shaft 32a and the speed Ne of the engine 22 is decreased to the preset self-sustaining speed Nref with the setting of the target throttle opening amount TH* that increases the intake air amount of the engine 22 as the battery temperature Tb increases (i.e., with the intake air adjustment) and the injection of fuel into the combustion chambers 120, when there is a demand to decelerate the ring gear shaft 32a by the driver releasing the accelerator pedal 83 while the catalyst degradation suppression flag Fc is set to a value of 1 and a fuel cut in the engine 22 is being prohibited to suppress degradation of the exhaust gas control catalyst 141c, corresponds to a control portion. The throttle valve 123 that regulates the intake air amount corresponds to an intake air amount regulating portion. The combination of the crank position sensor 180 and the engine ECU 24 corresponds to a rotation speed obtaining portion. The temperature sensor 51 that detects the battery temperature Tb corresponds to a temperature obtaining portion. The clutch C1 that selectively connects and disconnects the rotating shaft of the motor MG1 to and from the sun gear 31 of the power splitting/combining device 30 corresponds to a connecting/disconnecting portion. The power splitting/combining device 30 that has the carrier 34 that is connected to the crankshaft 26 of the engine 22, the sun gear 31 that is connected to the rotating shaft of the motor MG1, and the ring gear 32 that is connected to the ring gear shaft 32a that serves as the drive shaft, with these three elements being able to differentially rotate with respect to one another, corresponds to a planetary gear set.

However, the internal combustion engine is not limited to the engine 22 that outputs power by receiving a supply of hydrocarbon fuel such as gasoline or light oil. That is, the internal combustion engine may be another type of engine such as a hydrogen engine. The exhaust gas control apparatus may be any type of exhaust gas control apparatus as long as it includes an exhaust gas control catalyst for purifying exhaust gas discharged from the engine 22. The first electric motor and the second electric motor are not limited to being synchronous motor-generators like the motors MG1 and MG2, but may be another type of electric motor such as an induction motor. The power storage device is not limited to being a secondary motor like the battery 50, but may also take another form such as a capacitor as long as it is able to supply and receive electric power to and from the electric motor. The required torque setting portion is not limited to a structure that sets the required torque based on the accelerator operation amount and the vehicle speed, but may take another form such as a structure that sets the required driving force based on only the accelerator operation amount, for example. The control portion may also take a form other than the combination of the hybrid ECU 70, the engine ECU 24, and the motor ECU 40, such as a single electronic control unit, for example.

The invention is able to be used in the manufacturing industry of power output apparatuses and hybrid vehicles and the like.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

What is claimed is:

1. A power output apparatus that outputs power to a drive shaft, comprising:
   an internal combustion engine;
   an exhaust gas control apparatus that includes a catalyst for purifying exhaust gas discharged from the internal combustion engine;
   a first electric motor that inputs and outputs power;
   a power distributing portion that is connected to three shafts, including an engine shaft of the internal combustion engine, a rotating shaft of the first electric motor, and the drive shaft, and inputs and outputs power that is based on power input and output from and to two of these three shafts, to and from the remaining shaft;
   a second electric motor that inputs and outputs power from and to the drive shaft;
   a power storage device that supplies and receives electric power to and from the first electric motor and the second electric motor;
   a required torque setting portion that sets a required torque that is required at the drive shaft; and a control portion that, when there is a demand to decelerate the drive shaft while a supply of fuel to the internal combustion engine is being prohibited to suppress degradation of the catalyst, controls the internal combustion engine, the first electric motor, and the second electric motor such that torque based on the set required torque is output to the drive shaft and the rotation speed of the internal combustion engine is decreased to a preset self-sustaining rotation speed with the supply of fuel and an intake air adjustment that increases the intake air amount of the internal combustion engine as the temperature of the power storage device increases.

2. The power output apparatus according to claim 1, further comprising:
an intake air amount regulating portion that regulates the intake air amount of the internal combustion engine;
a rotation speed obtaining portion that obtains the rotation speed of the internal combustion engine; and
a temperature obtaining portion that obtains the temperature of the power storage device,
wherein the control portion sets a control amount of the input air amount regulating portion using the obtained rotation speed of the internal combustion engine, the obtained temperature of the power storage device, and a restriction in which there is a tendency to increase the intake air amount as the rotation speed of the internal combustion engine increases, and increase the intake air amount as the temperature of the power storage device increases.

3. The power output apparatus according to claim 1, further comprising:
a temperature obtaining portion that obtains the temperature of the power storage device,
wherein when the obtained temperature of the power storage device is equal to or lower than a predetermined temperature, the control portion controls the internal combustion engine, the first electric motor, and the second electric motor such that torque based on the set required torque is output to the drive shaft and the rotation speed of the internal combustion engine decreases to the self-sustaining rotation speed with the supply of fuel, the intake air adjustment, and the output of negative torque from the first electric motor to the engine shaft, and when the obtained temperature of the power storage device is above the predetermined temperature, the control portion controls the internal combustion engine, the first electric motor, and the second electric motor such that torque based on the set required torque is output to the drive shaft and the rotation speed of the internal combustion engine decreases to the self-sustaining rotation speed with the supply of fuel and the intake air adjustment without outputting torque from the first electric motor.

4. The power output apparatus according to claim 1, further comprising:
a temperature obtaining portion that obtains the temperature of the power storage device; and
a connecting/disconnecting portion that selectively connects and disconnects the rotating shaft of the first electric motor to and from the power distributing portion,
wherein when the obtained temperature of the power storage device is equal to or lower than a predetermined temperature, the control portion controls the internal combustion engine, the first electric motor, and the second electric motor such that torque based on the set required torque is output to the drive shaft and the rotation speed of the internal combustion engine decreases to the self-sustaining rotation speed with the supply of fuel, the intake air adjustment, and the output of negative torque from the first electric motor to the engine shaft, and when the obtained temperature of the power storage device is above the predetermined temperature, the control portion controls the connecting/disconnecting portion to disconnect the rotating shaft of the first electric motor from the power distributing portion, and controls the internal combustion engine, the first electric motor, and the second electric motor such that torque based on the set required torque is output to the drive shaft and the rotation speed of the internal combustion engine decreases to the self-sustaining rotation speed with the supply of fuel and the intake air adjustment.

5. The power output apparatus according to claim 1, wherein the power distributing portion is a planetary gear set that has a first element that is connected to the rotating shaft of the first electric motor, a second element that is connected to the engine shaft of the internal combustion engine, and a third element that is connected to the drive shaft, with the three elements configured to differentially rotate with respect to one another.

6. The power output apparatus according to claim 1, wherein the preset self-sustaining rotation speed is within the range of 800 to 1200 rpm.

7. The power output apparatus according to claim 1, wherein the preset self-sustaining rotation speed is idling speed.

8. A hybrid vehicle comprising:
a power output apparatus that outputs power to a drive shaft; and
a driving wheel that is connected to the drive shaft
the power output apparatus comprising:
an internal combustion engine;
an exhaust gas control apparatus that includes a catalyst for purifying exhaust gas discharged from the internal combustion engine;
a first electric motor that inputs and outputs power;
a power distributing portion that is connected to three shafts, including an engine shaft of the internal combustion engine, a rotating shaft of the first electric motor, and the drive shaft, and inputs and outputs power that is based on power input and output from and to two of these three shafts, to and from the remaining shaft;
a second electric motor that inputs and outputs power from and to the drive shaft;
a power storage device that supplies and receives electric power to and from the first electric motor and the second electric motor;
a required torque setting portion that sets a required torque that is required at the drive shaft; and
a control portion that, when there is a demand to decelerate the drive shaft while a supply of fuel to the internal combustion engine is being prohibited to suppress degradation of the catalyst, controls the internal combustion engine, the first electric motor, and the second electric motor such that torque based on the set required torque is output to the drive shaft and the rotation speed of the internal combustion engine is decreased to a preset self-sustaining rotation speed with the supply of fuel and an intake air adjustment that increases the intake air amount of the internal combustion engine as the temperature of the power storage device increases.

9. A control method of a power output apparatus provided with an internal combustion engine, an exhaust gas control apparatus that includes a catalyst for purifying exhaust gas discharged from the internal combustion engine, a first electric motor that inputs and outputs power, a power distributing portion that is connected to three shafts, including an engine shaft of the internal combustion engine, a rotating shaft of the first electric motor, and the drive shaft, and inputs and outputs power that is based on power input and output from and to two of these three shafts, from and to the remaining shaft, a second electric motor that inputs and outputs power from and to the drive shaft, and a power storage device that supplies and receives electric power to and from the first electric motor and the second electric motor, comprising:

controlling, when there is a demand to decelerate the drive shaft while a supply of fuel to the internal combustion engine is being prohibited to suppress degradation of the catalyst, the internal combustion engine, the first electric motor, and the second electric motor such that torque based on a required torque that is required at the drive shaft is output to the drive shaft and the rotation speed of the internal combustion engine is decreased to a preset self-sustaining rotation speed with the supply of fuel and an intake air adjustment that increases the intake air amount of the internal combustion engine as the temperature of the power storage device increases.

* * * * *